(12) United States Patent
Corveleyn

(10) Patent No.: US 7,091,268 B2
(45) Date of Patent: Aug. 15, 2006

(54) FLUOROELASTOMER COMPOSITION COMPRISING A MINERAL OIL

(75) Inventor: Steven G. Corveleyn, Knokke-Heist (BE)

(73) Assignee: 3M Innovative Properties Company, St. Paul, MN (US)

( * ) Notice: Subject to any disclaimer, the term of this patent is extended or adjusted under 35 U.S.C. 154(b) by 456 days.

(21) Appl. No.: 10/009,353

(22) PCT Filed: Jun. 8, 2001

(86) PCT No.: PCT/US01/18502

§ 371 (c)(1),
(2), (4) Date: Nov. 13, 2001

(87) PCT Pub. No.: WO02/02690

PCT Pub. Date: Jan. 10, 2002

(65) Prior Publication Data

US 2003/0080457 A1   May 1, 2003

(30) Foreign Application Priority Data

Jun. 29, 2000 (EP) ................................. 00202277

(51) Int. Cl.
*C08K 3/20* (2006.01)
*C08L 91/06* (2006.01)
(52) U.S. Cl. .................. 524/275; 524/276; 524/277
(58) Field of Classification Search ............. 524/275, 524/276, 277
See application file for complete search history.

(56) References Cited

U.S. PATENT DOCUMENTS

| 3,876,654 A | 4/1975 | Pattison | 260/30.4 R |
| 3,929,707 A | 12/1975 | Berg et al. | 260/29.7 T |
| 4,233,421 A | 11/1980 | Worm | 525/343 |
| 4,485,062 A * | 11/1984 | Dawes et al. | 264/171 |
| 4,912,171 A | 3/1990 | Grootaert et al. | 525/340 |
| 4,948,830 A | 8/1990 | Martin et al. | 524/462 |
| 5,086,123 A | 2/1992 | Guenthner et al. | 525/276 |
| 5,262,490 A | 11/1993 | Kolb et al. | 525/343 |
| 5,591,804 A | 1/1997 | Coggio et al. | 525/276 |
| 5,929,169 A | 7/1999 | Jing et al. | 525/146 |

FOREIGN PATENT DOCUMENTS

| EP | 0 661 304 A1 | 7/1995 |
| EP | 0 691 371 A1 | 1/1996 |
| EP | 0 769 521 A1 | 4/1997 |
| EP | 0 784 064 A1 | 7/1997 |
| WO | WO 96/00761 | 1/1996 |

OTHER PUBLICATIONS

Brullo, R.A., "Fluoroelastomer Rubber for Automotive Applications," *Automotive Elastomer & Design*, Jun. 1985.
Brullo, R.A., "Fluoroelastomer Seal Up Automotive Future," *Materials Engineering*, Oct. 1988.
"Fluorocarbon Elastomers," Kirk-Othmer, *Encyclopedia of Chemical Technology*, vol. 8, pp. 990-1005 (4$^{th}$ ed., John Wiley & Sons, 1993).
*Modern Fluoropolymers*, Edited by John Scheirs, 1997, John Wiley & Sons Ltd., Chapter 5.
*Modern Fluoropolymers*, Edited by John Scheirs, 1997, John Wiley & Sons Ltd., Chapter 32.

* cited by examiner

*Primary Examiner*—Nathan M. Nutter
(74) *Attorney, Agent, or Firm*—Dean M. Harts

(57) ABSTRACT

The present invention provides the use of a mineral oil in a fluoroelastomer composition comprising a fluoroelastomer to improve the flow of said composition during processing to form an article therefrom and/or to improve the release from a mold of a vulcanized article produced from said fluoroelastomer composition. Further provide are a fluoroelastomer composition that includes a mineral oil, a method of making an article therewith and a method of preparing the fluoroelastomer composition.

5 Claims, No Drawings

FLUOROELASTOMER COMPOSITION COMPRISING A MINERAL OIL

FIELD OF THE INVENTION

The present invention relates to fluoroelastomer compositions that show an improved flow when being processed to an article by means of for example extrusion or injection molding. The invention further relates to a method of making such fluoroelastomer composition and to a method of making articles using such a fluoroelastomer composition.

BACKGROUND OF THE INVENTION

Fluoroelastomers, particularly the copolymers of vinylidene fluoride with other ethylenically unsaturated halogenated monomers, such as hexafluoropropene, have particular utility in high temperature applications, such as seals, gaskets, and linings—see, for example, Brullo, R. A., "Fluoroelastomer Rubber for Automotive Applications," Automotive Elastomer & Design, June 1985, "Fluoroelastomer Seal Up Automotive Future," Materials Engineering, October 1988, and "Fluorocarbon Elastomers," Kirk-Othmer, Encyclopedia of Chemical Technology, Vol. 8, pp. 990–1005 (4th. ed., John Wiley & Sons, 1993).

Fluoroelastomers when cured have good resistance to damage by heat, solvents, corrosive chemicals, and steam. However, in the manufacture of molded products from these polymers, particularly in modern manufacturing methods, e.g., injection molding, the cured polymers generally adhere to the surface of the mold even when mold release agents are sprayed on the mold cavity or incorporated in the polymer, and the shaped article is frequently torn or damaged when removed from the mold. Also, the incorporation of a mold release agent into the polymer can have serious adverse effects on the physical properties of the cured composition, for example, Mooney Scorch and compression set, which can limit the successful commercial use of the cured composition. Deposits of polymer on the mold cavity surface ("mold fouling") and poor release of the shaped vulcanizate from the mold are major reasons for defects, resulting in rejection of the shaped article which adds to the expense of manufacture of such molded articles Furthermore, the processability in terms of ease of mixing, moulding cycle times and throughput in case of extrusion is fairly poor compared to conventional elastomers because of the poor flow characteristics of the fluoroelastomer during processing. Processing aids have been suggested to improve the processability of fluoroelastomers such as for example disclosed in EP 691 371.

However, although such processing aids are effective, there continues to exist a need to find further suitable processing aids. However, such processing aids should not adversely affect the properties of the fluoroelastomer article produced and should desirably be compatible with existing manufacturing procedures, in particular, they preferably should not contaminate the equipment or contribute to flow defects, such as knit-lines. Furthermore, the processing aids should desirably not affect the scorching safety or preferably improve the scorching safety.

Knit-lines are molding defects resulting from the incomplete joining of two or more polymer streams during the molding process. While changing the mold temperature or compound temperature may influence this behavior, incompatible process aids may have a larger effect. To the extent any process aid or additive exudes to the surface of the molten polymer stream during processing, such a layer of exuded process aid or additive may serve to prevent the proper joining or knitting of the two molten polymer streams as they meet in a mold cavity. This incomplete or defective joining of the polymer streams results in a defect in the finished part called a knit-line and is a likely point of failure in use.

Many conventional fluoroelastomer compositions tend toward "scorching" behavior, i.e., the premature crosslinking or partial cure of the composition when exposed to elevated temperatures or conditions of high shear. This scorching behavior particularly is pronounced when the fluoroelastomer is injection molded, wherein scorching is characterized by a premature cure initiation occurring prior to and during injection of the compounded composition into a mold. The point of cure initiation for injection-molded fluoroelastomers may be defined as the time after which the compounded fluoroelastomer is subjected to injection molding conditions (i.e., upon introduction into an injection barrel at a temperature above approximately 70–90° C. and/or while injecting the compound into the mold under high shear at temperatures between about 180 and 200° C.) when the curing compound begins to gel or harden. Such a change in physical properties, particularly the corresponding viscosity increase, can greatly reduce processing efficiency by hindering the ability to inject the compounded mixture into a mold. Scorching phenomena also produce high levels of waste product; because a cured fluoroelastomer is very difficult to reprocess, any fluoroelastomer that cures outside the mold cavity must usually be discarded.

SUMMARY OF THE INVENTION

It has been found that the addition of a mineral oil to a fluoroelastomer composition improves the flow of the composition when that composition is being processed to form an article. In particular, it has been found that the throughput of the composition in extrusion is substantially improved by the mineral oil. Also, the speed of mold filling and the flow path length of the composition in injection molding, transfer molding and compression molding can be improved by the mineral oil. When forming certain articles such as O-rings, a knit-line, which might be formed at the point where the composition flows meet, can generally be avoided with the aid of the mineral oil. It has also been observed that articles produced from a fluoroelastomer composition that includes a mineral oil generally have an improved release from a mold after vulcanization leading to decreased mold defects. Finally, the mineral oil addition does not adversely affect scorching.

The present invention thus provides the use of a mineral oil in a fluoroelastomer composition comprising a fluoroelastomer to improve the flow of said composition during processing to form an article therefrom and/or to improve the release from a mold of a vulcanized article produced from said fluoroelastomer composition.

In a further aspect of the present invention, there is provided a method of making a fluoroelastomer article comprising the steps of providing a fluoroelastomer composition comprising a fluoroelastomer and a mineral oil and processing said composition to form said fluoroelastomer article by means of a processing technique selected from the group consisting of extrusion, injection molding, transfer molding, compression molding and combinations thereof.

The invention also provides a fluoroelastomer composition comprising a fluoroelastomer and a mineral oil, said composition being free of vegetable wax or containing vegetable wax in an amount of less than 2 parts by weight per 100 parts by weight of fluoroelastomer.

Finally, the invention provides a method of making a fluoroelastomer composition having improved flow characteristics when processed, said method comprising the steps of blending together a mineral oil and a fluoroelastomer to obtain a fluoroelastomer composition that is free of vegetable wax or alternatively to blend together a mineral oil, a fluoroelastomer and a vegetable wax to obtain a fluoroelastomer composition that contains a vegetable wax in an amount of less than 2 parts by weight for 100 parts by weight of fluoroelastomer.

DETAILED DESCRIPTION OF THE INVENTION

The mineral oils used in the fluoroelastomer composition may comprise naphthenic, aromatic (other than naphthenic) and paraffinic hydrocarbons and mixtures thereof. Mineral oils have been classified by their content of naphthenic, aromatic and paraffinic content into 4 major categories according to ASTM norm D-2226-93. These categories include 101 (highly aromatic), 102 (aromatic), 103 (naphthenic) and 104 (paraffinic). Any mineral oil can be used with the fluoroelastomer composition although the mineral oils belonging to the categories 102, 103 and 104 are generally preferred. The amount of mineral oil contained in the composition may vary over a broad range but will generally be between 0.25 parts by weight and 15 parts by weight per 100 parts by weight of the fluoroelastomer. If the amount of mineral oil is below 0.25 parts, the effect of the mineral oil on the flow properties of the fluoroelastomer during processing may be too small or practically absent whereas an amount above 15 parts by weight may negatively impact the desired end properties of the fluoroelastomer article produced from the composition. A preferred range of mineral oil is between 0.5 parts by weight and 8 parts by weight per 100 parts by weight of the fluoroelastomer.

As is well known to those skilled in the art, mineral oils are incompatible with fluoroelastomers ("Modern Fluoropolymers", Edited by John Scheirs, 1997, John Wiley & Sons Ltd., chapter 5 and 32). For this reason, the oils have been avoided because they could disrupt the mixing process by which the fluoroelastomer is blended with other components. It has nevertheless been found in the present invention that the mineral oil can be blended with the fluoroelastomers when the oil is very slowly mixed into the fluoroelastomer. However, a more commercially attractive way to include the mineral oil into the composition comprises adsorbing the mineral oil on a carrier prior to mixing with the fluoroelastomer. Suitable carriers are generally solid carriers capable of adsorbing the oil. Typically, suitable carriers comprise carbon black or inorganic particles such as silicates, barium sulfate, clays, carbonates, calcium hydroxide, oxides like calcium oxide, magnesium oxide, chromium oxide, iron oxides and titanium oxide. To load the mineral oil on the carrier, the carrier is mixed with the mineral oil so as to adsorb the mineral oil. It is commercially most attractive that the carrier is fully saturated with the mineral oil, i.e. the oil is added to the carrier until no further oil is adsorbed by it. The mineral oil adsorbed on the carrier, for example oil adsorbed on carbon black or inorganic particles can then be easily blended into the fluoroelastomer. It is believed that during this blending operation at least some of the oil will desorb from the carrier for example under the influence of heat and kinetic energy supplied to the composition while mixing.

In a particular aspect of the present invention, the fluoroelastomer composition may further comprise a vegetable wax or non-vegetable wax and derivatives thereof such as those available under the tradename ARMEEN 18D. A synergistic effect on the flow properties of the fluoroelastomer composition during processing has been observed if the mineral oil is used in combination with a wax. For example, good flow properties were obtained with 2 parts or less by weight of mineral oil per 100 parts by weight of fluoroelastomer combined with 1 part by weight or less of a wax, in particular a vegetable wax, per 100 parts by weight of fluoroelastomer. Preferably, the amount of wax (vegetable or non-vegetable) included in the fluoroelastomer composition will be less than 2 parts by weight per 100 parts by weight of the fluoroelastomer. Particularly when the wax is a vegetable wax, the amount thereof is preferably kept below 2 parts by weight per 100 parts by weight of fluoroelastomer, preferably between 0.2 and 1.5 parts by weight for 100 parts by weight of fluoroelastomer. It has been observed that if the amount of vegetable wax such as carnauba wax is included in amounts of 2 or more parts by weight per 100 parts by weight of the fluoroelastomer, the composition may become undesirable for processing with injection molding and extrusion and/or have an undesirable effect on the properties of the finished article. Examples of waxes that may be used in the fluoroelastomer composition include carnauba wax, VPA No. 2, Montan wax, polyethylene wax.

The fluoroelastomer contained in the fluoroelastomer compositions according to the invention is generally a polymer that has elastomeric properties and that comprises a major portion of repeating units that are derived from an ethylenically unsaturated and fluorinated monomer, such as an ethylenically unsaturated monomer having a fluorinated double bond (i.e. one or more of the carbon atoms of the double bond carry one or more fluorine atoms). Fluoroelastomers in connection with the present invention include perfluoroelastomers as well as elastomers that are not fully fluorinated. Preferred fluoroelastomers are polymers that have repeating units derived from one or more of the following fluoromonomers: vinylidene fluoride (VF2), hexafluoropropene (HFP), chlorotrifluoroethylene, 2-chloropentafluoropropene, fluorinated vinyl ethers such as perfluoro(methyl vinyl ether) (PMVE), fluorinated allyl ethers, tetrafluoroethylene (TFE), 1-hydropentafluoropropene, dichlorodifluoroethylene, trifluoroethylene, and mixtures thereof. The aforementioned fluoromonomers may further be copolymerized with other compounds such as with cure-site monomers (CSM) (e.g. bromine containing monomers or perfluorinated monomers such as perfluorobenzyl vinyl ether) or with non-fluorinated alpha olefin co-monomers such as ethylene (E) and propylene (P). Preferred elastomers are copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. Specific examples of copolymers include copolymers having a combination of monomers as follows: VF2-HFP, VF2-TFE-HFP, VF2-TFE-HFP-CSM, VF2-TFE-PMVE-CSM, TFE-P, E-TFE-PMVE-CSM and TFE-PMVE-CSM.

Fluoroelastomer copolymers according to the type described above are available commercially as copolymer gumstock under for example the "Dyneon" trademark by Dyneon LLC of Saint Paul, Minn. Suitable products of this line include Dyneon™ FC-2230, FC-2145, FC-2178, and FC-2211. Other commercially available products include fluoroelastomers sold under the "Viton" trademark.

The fluoroelastomer compositions further typically include a cure system, also called vulcanization system so as to provide the capability of vulcanization to the fluoroelastomer compositions. Suitable curing systems for use in the compositions include the curing systems known in the prior art. Useful curing systems include for example the peroxide curing system and the polyhydroxy curing system. The polyhydroxy curing system generally comprises one or more polyhydroxy compounds and one or more organo-onium accelerators. The organo-onium compounds useful in the present invention typically contain at least one heteroatom, i.e., a non-carbon atom such as N, P, S, O, bonded to organic or inorganic moieties. One class of quaternary organo-onium compounds useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the organo-onium compounds useful in this invention are described and known in the art. See, for example, U.S. Pat. Nos. 4,233,421 (Worm), 4,912,171 (Grootaert et al.), 5,086,123 (Guenthner et al.), and 5,262,490 (Kolb et al.), U.S. 5,929,169, all of whose descriptions are herein incorporated by reference. Representative examples include the following individually listed compounds and mixtures thereof:

triphenylbenzyl phosphonium chloride
tributylallyl phosphonium chloride
tributylbenzyl ammonium chloride
tetrabutyl ammonium bromide
triaryl sulfonium chloride
8-benzyl-1,8-diazabicyclo[5,4,0]-7-undecenium chloride
benzyl tris(dimethylamino)phosphonium chloride
benzyl(diethylamino)diphenylphosphonium chloride Another class of useful organo-onium compounds include those having one or more pendent fluorinated alkyl groups. Generally, the most useful fluorinated onium compounds are disclosed by Coggio et al. in U.S. Pat. No. 5,591,804.

The polyhydroxy compound may be used in its free or non-salt form or as the anionic portion of a chosen organo-onium accelerator. The crosslinking agent may be any of those polyhydroxy compounds known in the ail to function as a crosslinking agent or co-curative for fluoroelastomers, such as those polyhydroxy compounds disclosed in U.S. Pat. Nos. 3,876,654 (Pattison), and 4,233,421 (Worm). Representative aromatic polyhydroxy compounds include any one of the following: di-, tri-, and tetrahydroxybenzenes, naphthalenes, and anthracenes, and bisphenols of the following formula:

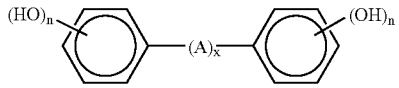

wherein A is a difunctional aliphatic, cycloaliphatic, or aromatic radical of 1 to 13 carbon atoms, or a thio, oxy, carbonyl, sulfonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, bromine, or with a carboxyl or an acyl radical (e.g.,—COR where R is H or a C1 to C8 alkyl, aryl, or cycloalkyl group) or alkyl radical with, for example, 1 to 8 carbon atoms. It will be understood from the above bisphenol formula that the —OH groups can be attached in any position (other than number one) in either ring. Blends of two or more of these compounds are also used.

One of the most useful and commonly employed aromatic polyphenols of the above formula is 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) are also widely used in practice.

Prior to curing, an acid acceptor is mixed into a fluoroelastomer composition that comprises a polyhydroxy cure system, after which storage life of the composition is more limited. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the fluoroelastomer.

The peroxide cure system may also be used to provide vulcanization capability to the fluoroelastomer composition. In case of a peroxide cure system, the fluoroelastomer should comprise a cure site component that is capable of participating in a peroxide cure reaction. The peroxide cure system further comprises a peroxide curative and optionally one or more co-agent that also participate in the peroxide cure reaction. The cure site component contained in the fluoroelastomer is generally a halogen containing material that is capable of participation in a peroxide cure reaction. Typically the halogen is bromine or iodine. Suitable cure-site components include terminally unsaturated monoolefins of 2 to 4 carbon atoms such as bromodifluoroethylene, bromotrifluoroethylene, iodotrifluoroethylene, and 4-bromo-3,3,4,4-tetrafluorobutene-1. Examples of other suitable cure site components include $CF_2\!\!=\!\!CFOCF_2CF_2Br$, $CF_2\!\!=\!\!CFOCF_2CF_2CF_2Br$, and $CF_2\!\!=\!\!CFOCF_2CF_2CF_2OCF_2CF_2Br$. Preferably, all or essentially all of these components are ethylenically unsaturated monomers.

Other useful cure-site components are brominated or iodinated chain transfer agents and initiators. Examples of useful chain transfer agents include perfluoroalkyl bromides or iodides. Examples of useful initiators include $NaO_2SC_2F_4OF_4X$ (where X is Br or I). Suitable peroxide curatives are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the inmost useful peroxides of this type are 2,5-dimethyl-2,5-di(tertiarybutylperoxy)hexyne-3 and 2,5-dimethyl-2,5-di(tertiarybutylperoxy) hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 1–3 parts by weight of peroxide per 100 parts by weight of fluoroelastomer is used.

Another material which is usually blended with the composition as a part of the peroxide curative system is a coagent composed of a polyunsaturated compound which is capable of cooperating with the peroxide to provide a useful cure. These coagents can be added in an amount equal to 0.1 and 10 parts per hundred parts by weight of fluoroelastomer, preferably between 2–5 parts per hundred parts by weight of fluoroelastomer. Examples of useful coagents include triallyl cyanurate; triallyl isocyanurate; tri(methylallyl isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

The fluoroelastomer composition may include further additives which are commonly used in the art such as fillers and processing aids commonly used in fluoroelastomer compositions. Fillers are usually included in an amount of up to 100 parts by weight for 100 parts by weight of fluoroelastomer, preferably in an amount of 1 to 50 parts by weight for 100 parts by weight of fluoroelastomer. Examples of fillers include thermal grade carbon black or non-black pigments of relatively low reinforcement characteristics such as clays or barytes. Diorgano sulfur oxide compounds may be added as well as other ingredients such as retarding agents and processing aids such as for example Structol™ WS 280.

To prepare the fluoroelastomer composition, the fluoroelastomer or mixture of fluoroelastomers, mineral oil preferably loaded on a carrier, vulcanization components and further optional adjuvants are intimately mixed by employing any of the known rubber mixing devices such as Banbury mixers, roll mills or any other convenient mixing device. For best results, the temperature of the composition during mixing should not rise above 120° C.

The fluoroelastomer compositions can be used to form articles. By the tern "article" in connection with the present invention is meant a final article such as for example an O-ring as well as preforms from which a final shape is made, e.g. a tube from which a ring is cut. To form an article, the fluoroelastomer composition can be extruded using a screw type extruder or a piston extruder. Alternatively, the fluoroelastomer composition can be shaped into an article using injection molding, transfer molding or compression molding. Compression molding consists of placing a quantity of cold uncured elastomer mixture into a heated mold cavity and subsequently closing the mold using adequate pressure to shape the article. After retaining the rubber at sufficient temperature during sufficient time to allow vulcanization to proceed it can then be demolded. Injection molding is a shaping technique whereby the elastomer mixture is first heated and masticated in an extruder screw then collected in a heated chamber from which it is then injected into a hollow mold cavity by means of a hydraulic piston. After vulcanization the article can then be demolded. Transfer molding is similar to injection molding with the difference being that the elastomer mixture is not preheated and masticated by an extruder screw but introduced as a cold mass in the heated injection chamber. Typical vulcanization conditions for fluoroelastomer mixtures are elevated temperatures e.g. 160° C. to 210° C., pressures above 7 bar and maintaining these conditions for 30 seconds, in fast injection molding processes to 5 minutes or longer for larger compression molded articles.

The following examples illustrate the invention further without however the intention to limit the invention thereto.

EXAMPLES

Abbreviations
Ex: example
Oiled black: Multiblack™: carbon black containing 50% oil (8% aromatic, 27% naphtenic, 65% paraffinic oil), available from Multiblend Chemicals Limited, Manchester.
MT N-990: Huber™ N 990 MT: carbon black, available from Degussa $Ca(OH)_2$: calcium hydroxide, Rhenofit CF available from RheinChemie.
Carnauba wax: Flora™ 202, available from Int. Wax & Refining Co
Struktol™ WS-280 : Organic silicone derivative, available from Schill & Seilacher
Armeen™ 18D: Octadecylamine, available from Akzo-Nobel
MgO: magnesium oxide: Elastomag™ 170 PWD, available from Morton International
PennzUltra™ 1122 and 1199 : Paraffinic rubber oils, available from Pennzoil-Quaker State Company
PennzNap™ 60, 500 and 1500 : Naphthenic Rubber oils, available from Pennzoil-Quaker State Company Saltex™: Aromatic extract, available from Pennzoil-Quaker State Company
FC-2174: vinylidene fluoride, hexafluoropropylene copolymer with incorporated cure system, available from Dyneon
FC-2176: vinylidene fluoride, hexafluoropropylene copolymer with incorporated cure system, available from Dyneon
FC-2181: vinylidene fluoride, hexafluoropropylene copolymer with incorporated cure system, available from Dyneon
E-14251 A: vinylidene fluoride, hexafluoropropylene, tetrafluoroethylene copolymer with incorporated cure system, available from Dyneon
E-15948: vinylidene fluoride hexafluoropropylene copolymer with incorporated cure system, available from Dyneon
FE 5840Q: vinylidene fluoride, hexafluoropropylene, tetrafluoroethylene copolymer with incorporated cure system, available from Dyneon
BRE-7132X: Viniydene fluoride, propylene, tetrafluoroethylene copolymer with incorporated cure system, available from Dyneon Test Methods
Cure and rheological properties of fluoroelastomer compositions were evaluated using the following test methods:
Vulcanisation behaviour Tests were run on uncured, compounded admixtures using the Goettfert Moving Die Rheometer (MDR) at 180 deg. C. on an 8 g quantity of the admixture in accordance with ASTM D 5289-93a for a rotorless curemeter, no preheat, an oscillator frequency of 50 cpm and a 0.2 deg. arc. Minimum torque (ML), maximum torque (MH), and the difference between MH and ML (delta torque), were reported. Also reported were Ts2 (the time to a 2 unit rise in torque from ML ; Tc50 (the time to increase torque above ML by 50% of delta torque), and Tc90 (the time to increase torque above ML by 90% of delta torque), all of which were reported in minutes. The maximum attainable vulcanization speed was represented by VMAX (Nm/m in).
Mooney Scorch was measured according to ASTM 1664, Part C (Measuring pre-vulcanisation characteristics). The minimum viscosity (Mmin) was recorded, as well as T3 (time to scorch=Mmin+3 units) and T18 (time to cure: Mmin+18 units).
Press-Cure data are data obtained from mechanical property testing after 150 by 150 by 2 mm sheets were pressed and allowed to vulcanise for 7 minutes at 177° C. mold temperature.
Post-Cure data was obtained from sheets prepared as described above which were then further treated by heating the sheets in a circulating air oven maintained at about 230 deg. C. for 16 hours.
Tensile Strength at Break, Elongation at Break and Stress at 100% Elongation were determined using a Instron™ mechanical tester with a 1 kN load cell in accordance with ASTM D 412-92.
Test specimen strips were cut from the press- or post-cured sheets. All tests were run at a constant cross head displacement rate of 500 mm/min. in fivefold. The values reported were averages of the five tests. Hardness Shore A (2"), Stress at 100% Elongation, Elongation at Break, and Tensile Strength at Break were reported in units of Mega Pascals (MPa), %, and MPa respectively.

Compression set resistance was measured on buttons, according to ASTM D395 (method B (25% deformation)). The buttons were molded at 177° C. for 15 minutes and subsequently post cured for 16 hrs at 230° C.

Internal Diameter (ID) measurement on O-rings was done using a Mitutoyo™ measuring projector.

The rheological behaviour of the fluoroelastomer compound was evaluated by using a Rheovulkameter, available from Goettfert, using a spiral mold.

The Rheovulkameter can be further characterised by the following parameters: temperature of the die and the piston were 100 deg. C., the temperature of the mold was 180 deg. C. The hydraulic pressure used was 80 bar. A preheat of 50 seconds and injection time of 120 seconds was used. After that the compound mixture was allowed to vulcanise for 3 minutes. The total volume (mm$^3$) and the maximum volume per second (mm$^3$/s) were recorded.

Evaluations of injection molding performance, i.e. mold release and flow under injection molding conditions, were performed using a DESMA 966.053 ZO lab injection molding machine available from Kloeckner Ferromatic Desma GmbH of Germany. The machine is further described as having 500 kN mold closing force, 27 kW total power installed, 55 mm injection piston diameter, 120 mm maximum piston stroke, 200 Mpa maximum injection pressure, 400 mm/sec. maximum injection speed and a plastication unit with 30 mm screw diameter and screw RPM of 30-220.

Two molds were used for the experiments: an O-ring mold and a spiral mold.

The O-ring mold was a 4 cavity mold with O-ring cavity internal diameter of 49.5 mm, O-ring cross-section of 3.00 mm, a runner length of 13 mm, sprue base diameter of 5.2 mm, sprue length of 29 mm, and each cavity had a vacuum canal. The mold steel was STAVAX ESR™ with a surface finish EDM.

Multiple molding cycles were made of each tested mixture.

The steady state O-ring injection molding conditions were 190 deg. C. mold temperature, 95 deg. C. injection barrel temperature, 60 deg. C. screw barrel temperature, injection speed 60% of maximum, after-injection pressure of 4.0 MPa for 5 seconds, screw RPM 35% of maximum, and a vacuum time of 2.5 seconds. The holding time and heating time were both dependent upon vulcanization speed and were adjusted to obtain cured O-rings. The injection volume was adjusted to give similar flash to the parts molded.

The second mold used was a spiral mold:

The spiral was 1000 mm long, 1.2 mm deep and 5 mm wide. The flow speed was followed by means of pressure sensors at 100 mm and at 200 mm. The time to reach 100 mm and 200 mm was recorded. Also the ultimate flow length of each mixture was recorded. This value was obtained by taking the average measured length of 10 molded spirals collected after first molding about 20 to allow the machine to come to steady state molding conditions. For all moldings the same injection pressure: 175 bar hydraulic pressure and the same injection speed 60% of max were used.

EXAMPLES

All examples were made with fluoroelastomers available from Dyneon. The fluoroelastomers were mixed with bisphenol AF crosslinking-agent (available from Aldrich Chemical Co.) and onium accelerator. The fluoroelastomer compositions were mixed with oil, predispersed on a carrier, and other curing and compounding ingredients as indicated in the tables of the examples. Mixing of all the samples used for injection molding were mixed on a water cooled Ø380× 750 mm two roll mill available from Agila™ in Belgium. All other mixtures were prepared on a water cooled Ø150×300 mm two roll mill available from Troester in Germany. Standard mixing procedures know to in the industry were used.

Examples 1 to 6 and Comparative Example C-1

Examples 1 to 6 and comparative example C-1 were made starting from fluoroelastomer FC-2174 to the compositions given in table 1. Compositions are presented in parts by weight per hundred parts by weight of fluoroelastomer (phr) as is custom in the rubber industry. The properties of the fluoroelastomer compositions are given in tables 2–5.

TABLE 1

Composition of fluoroelastomer compositions

| Compound | C-1 | Ex 1 | Ex 2 | Ex 3 | Ex 4 | Ex 5 | Ex 6 |
|---|---|---|---|---|---|---|---|
| FC-2174 | 100 | 100 | 100 | 100 | 100 | 100 | 100 |
| MT N-990 | 30 | 30 | 30 | 30 | 30 | 30 | 30 |
| Oiled black | — | 5 | 10 | 20 | 5 | 5 | 5 |
| Ca(OH)$_2$ | 6 | 6 | 6 | 6 | 6 | 6 | 6 |
| MgO | 3 | 3 | 3 | 3 | 3 | 3 | 3 |
| Carnauba wax | — | — | — | — | 1 | — | — |
| Struktol ™ WS-280 | — | — | — | — | — | 1 | — |
| Armeen ™ 18D | — | — | — | — | — | — | 1 |

TABLE 2

Rheological properties as measured with a Goettfert Moving Die Rheometer

| | C-1 | Ex 1 | Ex 2 | Ex 3 | Ex 4 | Ex 5 | Ex 6 |
|---|---|---|---|---|---|---|---|
| ML(Nm) | 0.09 | 0.11 | 0.11 | 0.10 | 0.11 | 0.11 | 0.10 |
| MH(Nm) | 1.28 | 1.37 | 1.30 | 1.16 | 1.48 | 1.55 | 1.43 |
| MH-ML Nm) | 1.19 | 1.26 | 1.19 | 1.06 | 1.37 | 1.44 | 1.33 |
| Ts2 (min.) | 0.8 | 0.8 | 0.7 | 0.6 | 0.8 | 0.8 | 0.9 |
| Tc50 (min.) | 1.7 | 1.7 | 1.6 | 1.7 | 1.6 | 1.6 | 1.5 |
| Tc90 (min.) | 2.3 | 2.5 | 2.3 | 2.6 | 2.7 | 2.6 | 2.8 |
| VMAX (Nm/min.) | 2.08 | 2.02 | 1.94 | 1.48 | 2.09 | 2.49 | 2.43 |

The results in table 2 indicate that the addition of oil carried on carbon black, did not significantly influence the vulcanisation characteristics as measured by the Moving Die Rheometer.

Example 3 had a significantly higher filler content because of black carrying the oil. It is this side effect that had a minor influence on some of the MDR values by rendering the compound less flexible.

TABLE 3

Mooney scorch test results

| | C-1 | Ex 1 | Ex 2 | Ex 3 | Ex 4 | Ex 5 | Ex 6 |
|---|---|---|---|---|---|---|---|
| Mmin (inch.pounds) | 34 | 34 | 30 | 11 | 34 | 36 | 28 |
| T3 (min.) | 31 | >60 | >60 | >60 | 38 | 48 | 56 |
| T18(min.) | >60 | >60 | >60 | >60 | >60 | >60 | >60 |

In all cases, the scorch safety as quantified by T3 increased with the use of oiled carbon black (a more flat curve was noticed). In fact the measured T3 values were for all oil containing samples significantly higher than the comparative, example 3, with the highest oil content, had a significantly lower compound viscosity as given by Mooney scorch minimum.

TABLE 4

Vulcanisate physical properties measured on post cured test plates.

|  | C-1 | Ex 1 | Ex 2 | Ex 3 | Ex 4 | Ex 5 | Ex 6 |
|---|---|---|---|---|---|---|---|
| Hardness Shore A(2") | 76 | 79 | 80 | 83 | 80 | 80 | 80 |
| Modulus 100% (MPa) | 6.6 | 7.4 | 7.6 | 8.5 | 7.0 | 7.6 | 8.8 |
| Tensile strength a/b (MPa) | 15.0 | 14.1 | 13.8 | 11.1 | 13.5 | 13.6 | 13.7 |
| Elongation % at break | 195 | 175 | 165 | 130 | 165 | 170 | 145 |

These data show that the use of oil does not detract significantly on the physical properties of the fluoroelastomer used. The differences in hardness and in elongation seen for example 3 is typical for fluoroelastomers with higher loads of filler as is here also the case.

TABLE 5

Results of Goettfert Rheovulkameter test

|  | C-1 | Ex 1 | Ex 2 | Ex 3 | Ex 4 | Ex 5 | Ex 6 |
|---|---|---|---|---|---|---|---|
| Total volume (mm$^3$) | 1310 | 1400 | 2067 | 7242 | 1866 | 1435 | 3127 |
| Max VOL/s (mm$^3$/s) | 29.00 | 31.25 | 48.63 | 103.20 | 72.25 | 34.25 | 84.50 |

The rheovulcameter data of table 5 present a comparison of flow behaviour and the much larger total injected volumes of the oil containing mixtures is evident as well as the significantly higher maximum injected volume speeds. Furthermore using oil in combination with a standard processing aids at 1 phr level shows dramatic differences in flow behaviour depending on the type of standard processing aids suggesting a synergistic effect with low levels of Carnauba Wax or Armeen™ 18D, as can be seen in examples 4, 5 and 6.

Examples 7 to 10 and Comparative Examples C-2 and C-3

In examples 7 to 10 fluoroelastomer compounds were made, starting from Dyneon E-15948, to which 1.5% active oil carried on Calcium silicate containing 70% wt oil (further called oiled Calciumsilicate 70%) was added, before addition of the other ingredients (indicated as E-15948 1.5% in table 6). Examples 8 and 10 further contain Carnauba wax, a conventional processing aid. The kind and amount of additives uses is given in table 6. Comparative examples C-2 and C-3 were made with E-15948 as is: without added oil. Comparative example C-3 also contains carnauba wax. The performance of the compositions is given in tables 7 to 12.

TABLE 6

Composition of fluoroelastomer mixtures

| Compound | C-2 | C-3 | Ex 7 | Ex 8 | Ex 9 | Ex 10 |
|---|---|---|---|---|---|---|
| E-15948 | 100 | 100 | — | — | — | 50 |
| E-15948 1.5% | — | — | 100 | 100 | 100 | 50 |
| MT N-990 | 30 | 30 | 30 | 30 | 30 | 30 |
| Ca(OH)$_2$ | 6 | 6 | 6 | 6 | 6 | 6 |
| MgO | 3 | 3 | 3 | 3 | 3 | 3 |
| Oiled Calciumsilicate 70% | — | — | — | — | 3.57 | — |
| Carnauba wax | — | 0.5 | — | 0.5 | — | 0.5 |

TABLE 7

Vulcanisation behaviour: Results of Goettfert MDR test (test time: 6 min)

|  | C-2 | C-3 | Ex 7 | Ex 8 | Ex 9 | Ex 10 |
|---|---|---|---|---|---|---|
| ML (Nm) | 0.15 | 0.15 | 0.16 | 0.16 | 0.17 | 0.15 |
| MH (Nm) | 1.29 | 1.33 | 1.26 | 1.34 | 1.14 | 1.38 |
| MH-ML (Nm) | 1.14 | 1.18 | 1.10 | 1.18 | 0.97 | 1.23 |
| Ts2 (min.) | 0.7 | 0.8 | 0.6 | 0.7 | 0.6 | 0.7 |
| Tc50 (min.) | 1.8 | 1.8 | 1.6 | 1.5 | 1.9 | 1.6 |
| Tc90 (min.) | 2.4 | 2.5 | 2.0 | 2.0 | 2.6 | 2.2 |
| VMAX (Nm/min.) | 1.89 | 1.89 | 2.03 | 2.18 | 1.28 | 2.16 |

The data show that no major differences in rheological properties, measured with the Goettfert MDR, were observed.

TABLE 8

Results of Mooney scorch test

|  | C-2 | C-3 | Ex 7 | Ex 8 | Ex 9 | Ex 10 |
|---|---|---|---|---|---|---|
| Mmin (inch.pounds) | 47 | 45 | 49 | 47 | 39 | 47 |
| T3 (min.) | >60 | 54 | >60 | 53 | >60 | 41 |
| T18 (min.) | >60 | >60 | >60 | >60 | >60 | >60 |

The results indicate that compounds containing carnauba wax had a somewhat inferior scorch safety, compared to samples without carnauba wax but with oil.

TABLE 9

Vulcanisate properties (press cured 7 min at 177° C.)

|  | C-2 | C-3 | Ex 7 | Ex 8 | Ex 9 | Ex 10 |
|---|---|---|---|---|---|---|
| Hardness Shore A(2") | 74 | 74 | 74 | 74 | 70 | 73 |
| Modulus 100% (MPa) | 4.1 | 3.8 | 4.0 | 4.0 | 3.4 | 4.0 |
| Tensile (MPa) | 9.7 | 8.1 | 7.8 | 7.3 | 7.5 | 7.4 |
| Elongation % | 280 | 260 | 245 | 250 | 260 | 250 |

The data show again that the presence of mineral oil in the composition does not substantially alter the mechanical properties.

TABLE 10 vulcanisate properties after post cure (16 hrs 230° C.)

|  | C-2 | C-3 | Ex 7 | Ex 8 | Ex 9 | Ex 10 |
|---|---|---|---|---|---|---|
| Hardness Shore A(2") | 77 | 77 | 77 | 78 | 77 | 77 |
| Modulus 100% (MPa) | 5.2 | 5.9 | 6.0 | 6.6 | 5.5 | 6.5 |
| Tensile (MPa) | 12.7 | 13.9 | 13.8 | 13.8 | 13.7 | 14.2 |
| Elongation % | 220 | 205 | 205 | 185 | 215 | 190 |

After post cure (nearly all applications of fluoroelastomers use post cured articles) differences in properties are even smaller than after press cure.

The compounds of examples 7 to 10 and comparative examples C-2 and C-3 have been tested for their injection molding processing properties. The test was set up such that data and samples were collected after reaching steady state molding conditions at minimal cycle time (>20 shots after start up with warm machine) and this at 190° C. real mold temperature. Further test conditions see above. In a first experiment, O-rings were molded. The results are given in table 11.

TABLE 11

Injection molding (O-rings)

|  | C-2 | C-3 | Ex 7 | Ex 8 | Ex 9 | Ex 10 |
|---|---|---|---|---|---|---|
| Release rating | 5 | 7–8 | 6–7 | 8 | 8 | 8 |
| Sprue behavior | 6–7 | 8 | 6–7 | 8 | 8 | 8 |
| Plastization stroke (mm) | 6.2 | 6.2 | 6.2 | 6.0 | 6.1 | 6.2 |
| Moldfill time (sec) | 2.1 | 2.0 | 2.2 | 1.4 | 1.3 | 1.8 |
| Heating time (sec) | 52 | 50 | 45 | 40 | 60 | 45 |
| ID | 48.14 | 48.13 | 47.81 | 47.79 | 47.37 | 47.92 |

Comparison of mold fill times as flow quantification shows dramatically shorter fill times if 4 phr oil is present in the composition. Similarly 1.5 phr or 0.75 phr oil combined with 0.5 phr carnauba wax show substantial shorter fill times. Comparing mold fill times of examples C-2,C-3, Ex 7 with Ex8 and 10 makes a synergistic effect between low quantities of Carnauba Wax and oil evident.

When comparing the important processing parameters mold release and sprue behaviour the improvements with the oil and the combinations with the low level of Carnauba Wax are again evidenced. Knit-line were not observed for the examples.

An injection molding test with a spiral mold was done in the same way (see also test conditions described earlier). The results are given in table 12.

TABLE 12

Injection molding spiral mold

|  | C-2 | C-3 | Ex 7 | Ex 8 | Ex 9 |
|---|---|---|---|---|---|
| Plast stroke (mm) | 6 | 6 | 6.2 | 6.2 | 6.4 |
| Flow path length (mm) | 229 | 228 | 228 | 235 | 342 |
| Inj. Piston halt after (sec) | 12.4 | 12.5 | 12.5 | 12.6 | 12.7 |
| time to pass 100 mm (sec) | 0.97 | 0.93 | 1.02 | 0.55 | 0.74 |
| time to pass 200 mm (sec) | 8.89 | 8.33 | 8.52 | 6.67 | 3.15 |
| Time 100 to 200 mm (sec) | 7.9 | 7.4 | 7.5 | 6.1 | 2.4 |
| Heating time (sec) | 38 | 40 | 28 | 28 | 44 |

The time to pass data indicating flow speeds show again the synergistic effect when combining oil and low levels of Carnauba Wax. Ex-9 shows that oil levels of 4 phr give a dramatic effect on flow speed and ultimate flow length.

Example 10bis, 11, 12 and Comparative Examples C-4 to C-6

Examples 10bis, and 12 were made with various fluoroelastomer polymer compounds (differing in monomer types and ratio's), available from Dyneon, as given in table 13. To all compounds were added 30 phr Huber N 990 MT, 6 phr calcium hydroxide and 3 phr magnesium oxide. The compounds further contained oil added as oiled black (50% oil) as given in table 13. Comparative examples C-4, C-5 and C-6 were made without added oiled black.

TABLE 13 composition of fluoroelastomer compounds

| Compound | Ex 10b | C-4 | C-5 | Ex 11 | C-6 | Ex 12 |
|---|---|---|---|---|---|---|
| Dyneon ™ FE-5840Q | 100 | 100 | — | — | — | — |
| E-14251A | — | — | 100 | 100 | — | — |
| BRE-7132X | — | — | — | — | 100 | 100 |
| Oiled Black (50%) | 8 | — | — | 8 | — | 8 |

A vulcanisation characterisation test was done using the Goettfert MDR test (6 min at 180° C. 12 min at 170° C. and 120 min at 140° C.). The use of oiled carbon black did not influence the vulcanisation behaviour as measured in this way. Also the physical properties were not different with or without oil.

However, a clear difference was observed when the flow behaviour was measured using a Goettfert rheovulkameter with spiral mold. The results are given in table 14.

TABLE 14

Goettfert rheovulkameter (spiral mold)

|  | Ex 10b | C-4 | C-5 | Ex 11 | C-6 | Ex 12 |
|---|---|---|---|---|---|---|
| Total volume (mm$^3$) | 2099 | 1398 | 1948 | 2060 | 1175 | 1592 |
| Max VOL/s (mm$^3$/s) | 49.50 | 25.50 | 32.93 | 58.08 | 23.25 | 39.75 |

In all cases an increase in volume and speed was noticed for the samples containing oil compared to the same samples without oil added, thus showing that the effects reported above are also evident in other types of fluoroelastomer polymers Examples 13 to 18

In examples 13 to 18, compounds were made with fluoroelastomer FC-2176. To all samples were added 30 phr Huber N 990 MT, 6 phr calciumhydroxide and 3 phr magnesiumoxide. Additionally Multiblack or oiled CaSilicate (with 70% oil) were added. The composition of the examples is given in table 15.

TABLE 15

Composition of fluoroelastomer compounds

| COMPOUND | Ex 13 | Ex 14 | Ex 15 | Ex 16 | Ex 17 | Ex 18 |
|---|---|---|---|---|---|---|
| Oiled black (50%) | 1 | 2 | 3 | 5 | — | — |
| Oiled CaSilicate (70%) | — | — | — | — | 1.43 | 2.86 |

A vulcanisation behavior test was done using the Goettfert MDR test (6 min at 180° C.). The use of oil did not influence the vulcanisation behaviour as measured in this way, even not at the higher level of added oil (example 16). Also the physical properties were not different when different amounts of oil were added.

A high scorch safety, as measured by the Scorch Mooney test was noticed (all values T3 and T18>60).

The flow behaviour was measured with a Goettfert rheovulkameter with spiral mold. The results are given in table 16.

TABLE 16

Flow behaviour, measured with Goettfert rheovulkameter

|  | Ex 13 | Ex 14 | Ex 15 | Ex 16 | Ex 17 | Ex 18 |
|---|---|---|---|---|---|---|
| Total volume (mm³) | 1323 | 1344 | 1370 | 1442 | 1467 | 1507 |
| Max VOL/s (mm³/s) | 28.75 | 28.50 | 31.50 | 34.75 | 33.91 | 33.25 |

A steady increase in total volume and speed was noticed as the concentration of oil increased. A small increase in compression set values was noticed as the amount of oil increased. The results are given in table 17.

TABLE 17

Compression set resistance (Method B: 25% deformation)

|  | Ex 13 | Ex 14 | Ex 15 | Ex 16 | Ex 17 | Ex 18 |
|---|---|---|---|---|---|---|
| % SET 70 HRS @ 200° C. | 21 | 21 | 22 | 24 | 22 | 23 |
| % SET 168 HRS @ 200° C. | 30 | 31 | 32 | 37 | 33 | 35 |

Examples 19 to 21 and Comparative Example C-6

In examples 19 to 21, compounds were made with fluoroelastomer FC-2181. To all samples were added 30 phr Huber N 990 MT, 6 phr calciumhydroxide and 3 phr magnesiumoxide. Additionally oiled black and carnauba wax were added as given in table 18. Comparative example C-6 was made in the same way, but without the addition of oil.

TABLE 18

Composition of fluoroelastomers

| Compound | C-6 | Ex 19 | Ex 20 | Ex 21 |
|---|---|---|---|---|
| oiled black (50%) | — | 3 | 10 | 7.5 |
| Carnauba wax | 0.75 | 0.50 | 0.50 | 0.25 |

Rheological and physical behaviour was tested for example 19 and comparative example C-6. No difference could be seen in the Goettfert MDR test or in physical behaviour. However, a clear difference could be seen when the flow behaviour was measured using a Goettfert rheovulkameter with spiral mold. The results are given in table 19.

TABLE 19

Flow behaviour as measured with a Goettfert rheovulkameter (spiral mold)

|  | C-6 | Ex 19 | Ex 20 | Ex 21 |
|---|---|---|---|---|
| Total volume (mm³) | 1246 | 1311 | 2447 | 1890 |
| Max VOL/s (mm³/s) | 35.41 | 42.91 | 95.25 | 79.38 |

The volume and speed increased when higher amount of oil were added. Very high values were obtained when 5 phr oil were used together with 0.5 phr carnauba wax. Samples made with 0.25 phr carnauba Wax and 3.75 phr oil (example 21) showed much better flow properties compared to a reference that contained 0.75 phr carnauba wax and no oil (C-6). This further illustrates the synergistic effect on improved flow behaviour of a fluoroelastomer compound containing a mixture of a conventional processing aid, such as Carnauba wax and mineral oil.

Examples 22 to 27 and Comparative Example C-7

In Examples 22 to 27, compounds were made with fluoroelastomer FC-2174. To all samples were added 30 phr Huber N 990 MT, 6 phr calciumhydroxide and 3 phr magnesiumoxide. Additionally various oils (different in composition), as given in table 20 were added. Comparative example C-7 was made without the addition of oil. The properties of the fluoroelastomer compositions are given in tables 21 to 24.

TABLE 20

Composition of fluoroelastomer compounds

| Compound | C-7 | Ex 22 | Ex 23 | Ex 24 | Ex 25 | Ex 26 | Ex 27 |
|---|---|---|---|---|---|---|---|
| PennzUltral ™ 1122 | — | 4 | — | — | — | — | — |
| PennzUltral ™ 1199 | — | — | 4 | — | — | — | — |
| PennzNap ™ 60 | — | — | — | 4 | — | — | — |
| PennzNap ™ 500 | — | — | — | — | 4 | — | — |
| PennzNap ™ 1500 | — | — | — | — | — | 4 | — |
| Saltex ™ | — | — | — | — | — | — | 4 |

TABLE 21

Results of Goettfert MDR test

|  | C-7 | Ex 22 | Ex 23 | Ex 24 | Ex 25 | Ex 26 | Ex 27 |
|---|---|---|---|---|---|---|---|
| ML (Nm) | 0.12 | 0.10 | 0.10 | 0.09 | 0.10 | 0.10 | 0.10 |
| MH (Nm) | 1.41 | 1.30 | 1.28 | 1.28 | 1.28 | 1.29 | 1.31 |
| MH-ML (Nm) | 1.29 | 1.20 | 1.18 | 1.19 | 1.18 | 1.19 | 1.21 |
| Ts2 (min.) | 0.8 | 0.8 | 0.8 | 0.9 | 0.8 | 0.8 | 0.8 |
| Tc50 (min.) | 1.8 | 1.8 | 1.8 | 1.8 | 1.8 | 1.8 | 1.7 |
| Tc90 (min.) | 2.5 | 2.8 | 2.7 | 2.8 | 2.8 | 2.8 | 2.7 |
| VMAX (Nm/min.) | 2.04 | 1.79 | 1.79 | 1.85 | 1.76 | 1.67 | 1.75 |

The table indicates that almost no differences occur in the MDR test, using different oils, and compared to a reference, without oil added.

TABLE 22

Mooney scorch, at 121° .C

|  | C-7 | Ex 22 | Ex 23 | Ex 24 | Ex 25 | Ex 26 | Ex 27 |
|---|---|---|---|---|---|---|---|
| Mmin (inch.pounds) | 37 | 29 | 29 | 28 | 29 | 30 | 30 |
| T3 (min.) | 54 | >60 | >60 | >60 | 50 | 49 | 48 |
| T18 (min.) | >60 | >60 | >60 | >60 | >60 | >60 | >60 |
| T18-T3 (min.) |  | 0 | 0 | 0 |  |  |  |

Scorch safety given by T3 is equivalent or better for the oil containing mixtures when compared to comparative example C-7.

TABLE 23

| | vulcanisate properties after post curing | | | | | | |
|---|---|---|---|---|---|---|---|
| | C-7 | Ex 22 | Ex 23 | Ex 24 | Ex 25 | Ex 26 | Ex 27 |
| Hardness Shore A(2") | 76 | 74 | 74 | 77 | 77 | 75 | 77 |
| Modulus 100% (MPa) | 5.7 | 5.3 | 5.3 | 5.5 | 5.2 | 4.6 | 5.2 |
| Tensile (Mpa) | 11.5 | 11.4 | 10.2 | 11.4 | 9.9 | 9.6 | 9.1 |
| Elongation % | 180 | 190 | 175 | 180 | 170 | 180 | 175 |

The data show that none of the different oils tested has a substantial effect on the mechanical properties of the vulcanisate.

TABLE 24

| | Goettfert rheovulkameter results (spiral mold) | | | | | | |
|---|---|---|---|---|---|---|---|
| | C-7 | Ex 22 | Ex 23 | Ex 24 | Ex 25 | Ex 26 | Ex 27 |
| TOTAL VOLUME (mm3) | 1135 | 2195 | 2106 | 2175 | 2095 | 1977 | 1822 |
| MAX VOL/s (mm3/s) | 21.25 | 46.87 | 47.16 | 50.08 | 46.75 | 44.83 | 46.25 |

Flow data of table 24 show that all oils provide dramatic improvement of flow behaviour. Some differences between the oils exist however all oils irrespective of their composition provide a dramatic improvement in flow speed and ultimate flow path length as given by total volume.

The invention claimed is:

1. Fluoroelastomer composition comprising a fluoroelastomer blended with a mineral oil, said composition being free of vegetable wax or containing vegetable wax in an amount of less than 2 parts by weight per 100 parts by weight of fluoroelastomer, optionally wherein at least part of said mineral oil is adsorbed on a carrier, and optionally wherein said composition further comprises a vulcanization system.

2. Fluoroelastomer composition according to claim 1 wherein said fluoroelastomer composition is free of any wax or contains a total amount of vegetable and non-vegetable wax of less than 2 parts by weight per 100 parts by weight of fluoroelastomer.

3. Fluoroelastomer composition according to claim 1 or 2 wherein said carrier comprises particles capable of adsorbing said mineral oil.

4. Fluoroelastomer composition according to claim 3 wherein said particles are selected from the group consisting of carbon black and inorganic particles.

5. Fluoroelastomer composition according to claim 1 or 2 wherein said mineral oil is comprised in the fluoroelastomer composition in an amount of 0.25 to 15 parts by weight for 100 parts by weight of fluoroelastomer.

* * * * *

UNITED STATES PATENT AND TRADEMARK OFFICE
CERTIFICATE OF CORRECTION

PATENT NO. : 7,091,268 B2  Page 1 of 1
APPLICATION NO. : 10/009353
DATED : August 15, 2006
INVENTOR(S) : Steven G. Corveleyn It is certified that error appears in the above-identified patent and that said Letters Patent is hereby corrected as shown below:

Column 5
Line 34, delete "ail" and insert -- art -- in place thereof.

Column 6
Line 43, delete "inmost" and insert -- most -- in place thereof.

Column 7
Line 22, delete "tern" and insert -- term -- in place thereof.

Column 8
Lines 6-8, delete "Saltex™:……………..Company" following "Company" and insert the same on line 7 as a separate paragraph.
Line 48. delete "(Nm/m in)." and insert -- (Nm/min). -- in place thereof.

Column 13
Line 60, insert -- 11 -- following "10bis,".

Column 14
Line14, insert -- ; -- following "180° C.".
Line 37, insert -- . -- following "polymers".

Column 16
Line 3, Table 20, delete "PennzUltral" and insert -- PennzUltra -- in place thereof.
Line 4, Table 20, delete "PennzUltral" and insert -- PennzUltra -- in place thereof.
Line 1, Table 22, delete "121° .C" and insert -- 121° C. -- in place thereof.

Signed and Sealed this

Twenty-fourth Day of October, 2006

JON W. DUDAS
*Director of the United States Patent and Trademark Office*